(12) United States Patent
Imamura et al.

(10) Patent No.: US 10,066,718 B2
(45) Date of Patent: Sep. 4, 2018

(54) CONTROL APPARATUS FOR DYNAMIC POWER TRANSMISSION APPARATUS

(71) Applicant: TOYOTA JIDOSHA KABUSHIKI KAISHA, Toyota-shi (JP)

(72) Inventors: Tatsuya Imamura, Okazaki (JP); Atsushi Tabata, Okazaki (JP); Koichi Okuda, Toyota (JP); Tooru Matsubara, Toyota (JP); Yasuhiro Hiasa, Miyoshi (JP); Keita Imai, Seto (JP); Takeshi Kitahata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 172 days.

(21) Appl. No.: 15/206,131

(22) Filed: Jul. 8, 2016

(65) Prior Publication Data

US 2017/0008510 A1 Jan. 12, 2017

(30) Foreign Application Priority Data

Jul. 10, 2015 (JP) ................................ 2015-138618

(51) Int. Cl.
*B60W 10/02* (2006.01)
*B60W 10/08* (2006.01)
(Continued)

(52) U.S. Cl.
CPC ......... *F16H 37/0833* (2013.01); *B60K 6/445* (2013.01); *B60K 17/02* (2013.01);
(Continued)

(58) Field of Classification Search
CPC ....... B60W 10/08; B60W 10/02; B60W 10/26
See application file for complete search history.

(56) References Cited

U.S. PATENT DOCUMENTS

2002/0094898 A1\* 7/2002 Hata ...................... B60K 6/365
475/5
2008/0109142 A1 5/2008 Endo
(Continued)

FOREIGN PATENT DOCUMENTS

| CN | 101137532 A | 3/2008 |
| JP | 2006-224696 A | 8/2006 |

(Continued)

*Primary Examiner* — Tisha D Lewis
(74) *Attorney, Agent, or Firm* — Oblon, McClelland, Maier & Neustadt, L.L.P.

(57) ABSTRACT

A control apparatus for a dynamic power transmission apparatus is provided. The dynamic power transmission apparatus includes a differential mechanism, an electric generator, an electric motor, and a fluid coupling. The electric motor is disposed at a position apart from a transmission path along which a dynamic power of an engine is transmitted to a driving wheel. The fluid coupling is disposed between the electric motor and the transmission path. The control apparatus includes an electronic controller configured to restrict a charge of an electric storage apparatus with an electric power generated by the electric generator, depending on a state of the electric storage apparatus, and control the fluid coupling to differentially rotate and to drive the electric motor by the electric power such that a dynamic power loss is generated in the fluid coupling, when restricting the charge of the electric storage apparatus.

8 Claims, 7 Drawing Sheets (51) Int. Cl.
*B60W 10/26* (2006.01)
*F16H 37/08* (2006.01)
*F16H 3/72* (2006.01)
*B60K 17/02* (2006.01)
*B60K 28/16* (2006.01)
*B60L 3/00* (2006.01)
*B60L 11/18* (2006.01)
*B60L 15/10* (2006.01)
*B60L 15/20* (2006.01)
*B60K 6/445* (2007.10)
*F16H 61/48* (2006.01)

(52) U.S. Cl.
CPC .......... *B60K 28/165* (2013.01); *B60L 3/0046* (2013.01); *B60L 11/1861* (2013.01); *B60L 11/1872* (2013.01); *B60L 15/10* (2013.01); *B60L 15/2054* (2013.01); *B60W 10/02* (2013.01); *B60W 10/08* (2013.01); *F16H 3/728* (2013.01); *B60L 2260/14* (2013.01); *B60W 2510/244* (2013.01); *B60Y 2200/92* (2013.01); *B60Y 2300/82* (2013.01); *F16H 61/48* (2013.01); *F16H 2200/2007* (2013.01); *F16H 2200/2038* (2013.01); *Y02T 10/6239* (2013.01); *Y02T 10/7258* (2013.01)

(56) References Cited

U.S. PATENT DOCUMENTS

| | | | | |
|---|---|---|---|---|
| 2008/0149407 | A1* | 6/2008 | Shibata | B60K 6/365 180/65.27 |
| 2011/0251747 | A1* | 10/2011 | Imai | B60K 6/365 701/22 |
| 2014/0257618 | A1* | 9/2014 | Hiasa | B60K 6/48 701/22 |
| 2014/0342871 | A1* | 11/2014 | Isomura | B60K 6/48 477/5 |

FOREIGN PATENT DOCUMENTS

| | | |
|---|---|---|
| JP | 2006-248466 A | 9/2006 |
| JP | 2014-113895 A | 6/2014 |

\* cited by examiner

|  |  |  |  | C1 | B1 | CS | MG1 | MG1 |
|---|---|---|---|---|---|---|---|---|
| EV | Forward/Backward | Single Drive | Drive |  |  |  | G | M |
|  |  |  | Engine Brake Use | △ | △ |  | G | M |
|  |  | Double Drive |  | ○ | ○ |  | M | M |
| HV | Parallel | Forward | High |  | ○ |  | G | M |
|  |  |  | Low | ○ |  |  | G | M |
|  |  | Backward | Low | ○ |  |  | G | M |
|  | Series | Forward |  |  |  | ○ | G | M |
|  |  | Backward |  |  |  | ○ | G | M |

CONTROL APPARATUS FOR DYNAMIC POWER TRANSMISSION APPARATUS

CROSS-REFERENCE TO RELATED APPLICATIONS

This application is based upon and claims the benefit of priority from Japanese Patent Application No. 2015-138618, filed on Jul. 10, 2015, the entire contents of which are incorporated herein by reference in entirety.

BACKGROUND OF THE DISCLOSURE

1. Field of the Disclosure

The present application relates to a control apparatus for a dynamic power transmission apparatus including an engine, an electric generator, and an electric motor.

2. Description of Related Art

Japanese Patent Application Publication No. 2014-113895 describes a hybrid-vehicle power train including a hybrid driving apparatus and a 4-speed automatic transmission. The hybrid driving apparatus is configured to link an engine and an electric generator with a differential mechanism, to control engine speed by an electric motor, to amplify engine torque, to output the engine torque from the differential mechanism, to drive the electric motor by the electric power generated by the electric generator, and to add the output torque of the electric motor to the torque output from the differential mechanism. The electric generator and the electric motor are electrically connected with an electric storage apparatus, and when the quantity of the electric power generated by the electric generator is greater than the quantity of the electric power to be consumed by the electric motor, the electric storage apparatus is charged with the excess electric power. Further, the apparatus described in JP 2014-113895 slips a clutch provided on the output side of the electric motor, and thereby, consumes the excess energy.

SUMMARY

When the excess energy is consumed by the slip of the clutch, the restriction of the electricity generation quantity in the electric generator is reduced by a quantity equivalent to the consumed energy. Therefore, the suppression of the output of the engine is relieved, and the decrease in the torque can be compensated by the electric generator. However, as described in JP 2014-113895, when the energy is consumed by the friction of the clutch, the energy is changed to heat, and therefore, there is a possibility that the temperature of the clutch increases and the durability decreases. Further, if the electricity generation quantity in the electric generator is restricted for the maintenance of the durability of the clutch, the torque by the electric generator is restricted in addition to the restriction of the output of the engine, and therefore, there is a possibility that the driving torque for vehicle running is insufficient.

This disclosure provides a control apparatus that can suitably control the driving torque without causing disadvantages such as the decrease in the durability of a dynamic power transmission apparatus, even when the charge is restricted.

A control apparatus for a dynamic power transmission apparatus according to an aspect of the disclosure is provided. The dynamic power transmission apparatus includes a differential mechanism, an electric generator, an electric motor, and a fluid coupling. The differential mechanism divides dynamic power output by an engine to a driving wheel and the electric generator. The electric generator generates electric power such that the electric motor is driven by the electric power and torque of the electric motor is output to the driving wheel and to charge an electric storage apparatus with some of the electric power. The electric motor is disposed at a position apart from a transmission path along which the dynamic power of the engine is transmitted to the driving wheel through the differential mechanism. The fluid coupling is disposed between the electric motor and the transmission path. The control apparatus includes an electronic controller. The electronic controller is configured to restrict the charge of the electric storage apparatus with the electric power generated by the electric generator, depending on a state of the electric storage apparatus. The electronic controller is configured to control the fluid coupling to differentially rotate and to drive the electric motor by the electric power such that a dynamic power loss is generated in the fluid coupling, when restricting the charge of the electric storage apparatus.

Here, the "case where the charge of the electric storage apparatus with the generated electric power is restricted" includes a case where the charge is restricted because the electric storage apparatus has already been charged with much electric power and therefore a chargeable electric power value is less than a predetermined value, a case where, even if the chargeable electric power value is large, the electric power to be generated exceeds the chargeable electric power value when the electric generator is controlled for satisfying the demand driving power, and the like.

In the control apparatus according to the above aspect, the electronic controller may be configured to control the torque of the electric motor such that a power, which is of power output by the engine and with which the electric storage apparatus is incapable of being charged, is equal to a power of the dynamic power loss by differential rotation of the fluid coupling.

Further, in the control apparatus according to the above aspect, the electronic controller may be configured to control the torque of the electric motor such that a sum of a torque to be transmitted to the driving wheel through the transmission path and a torque to be transmitted to the transmission path through the fluid coupling is maximized, when the engine outputs a predetermined power.

In the control apparatus according to the above aspect, the differential mechanism includes a first rotation element, a second rotation element, and a third rotation element, the differential mechanism performs a differential action with the first rotation element, the second rotation element, and the third rotation element, the first rotation element to receive torque of the engine, the second rotation element being linked with the electric generator, the third rotation element to output a torque to the driving wheel, and the fluid coupling adds the torque from the electric motor to the torque output from the third rotation element.

In the control apparatus according to the above aspect, in the case where the charge of the electric storage apparatus with the electric power generated by the electric generator is restricted in a state in which the engine is driven, the speed of the electric motor is increased and dynamic power is consumed by the fluid coupling. Therefore, the restriction of the electricity generation by the electric generator and the reaction torque by the electric generator is relieved. Thereby, the engine torque to be output through the differential mechanism increases sufficiently.

In that case, the torque of the electric motor is controlled such that the excess power with which the electric storage apparatus cannot be charged is equal to the power loss. Thereby, it is possible to suppress an excessive power consumption.

Further, in a state in which the engine outputs the predetermined power, the differential rotation quantity of the fluid coupling and the output torque of the electric motor are controlled such that a sum of an engine torque to be transmitted to the driving wheel and a torque of the electric motor to be transmitted to the driving wheel through the fluid coupling is maximized. Therefore, it is possible to sufficiently secure the driving torque for running.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
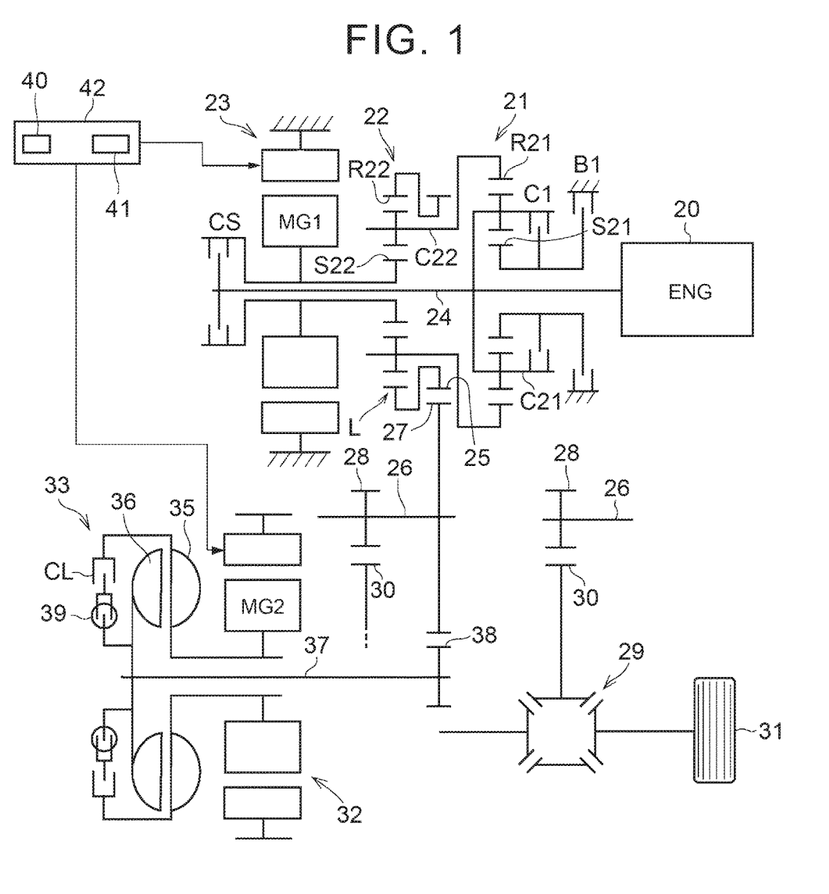
FIG. 1 is a schematic diagram showing an exemplary gear train of a dynamic power transmission apparatus (hybrid vehicle) that is a control object of a control apparatus according to the disclosure.

FIG. 1 shows an exemplary gear train of a dynamic power transmission apparatus of a hybrid vehicle that is controlled by a control apparatus in the disclosure. On an identical axis line to an engine (ENG) 20, an overdrive mechanism 21, a dynamic power division mechanism 22, and a first motor generator (MG1) 23 are disposed in order from the engine 20 side. The engine 20 is an internal combustion engine such as a gasoline engine or a diesel engine. The overdrive mechanism 21 is a mechanism for increasing the output speed such that the output speed is higher than the engine speed, and in the example shown in FIG. 1, is configured by a single pinion type planetary gear mechanism. Therefore, the overdrive mechanism 21 includes a sun gear S21, a ring gear R21 disposed on a circle concentric with the sun gear S21, and a carrier C21 holding, in a rotatable and revolvable manner, a pinion gear engaged with the sun gear S21 and the ring gear R21. The carrier C21 is linked with an input shaft 24 to which the dynamic power from the engine 20 is transmitted. Further, a first clutch C1 to selectively link the sun gear S21 and the carrier C21, and a brake B1 to selectively fix the sun gear S21 are provided. Therefore, by the engagement of the clutch C1, the overdrive mechanism 21 becomes a so-called direct connection stage (low) in which the whole of the overdrive mechanism 21 rotates in a united manner, and the change gear ratio of the overdrive mechanism 21 becomes "1". In contrast, when the rotation of the sun gear S21 is stopped by the engagement of the brake B1, the speed of the ring gear R21 becomes higher than the speed of the carrier C21, and the overdrive mechanism 21 becomes a so-called overdrive stage (high) in which the change gear ratio is lower than "1". Further, when both the first clutch C1 and the brake B1 are engaged, the whole of the overdrive mechanism 21 is fixed, and the revolution of the engine 20 is also stopped. Furthermore, when both the first clutch C1 and the brake B1 are disengaged, the sun gear S21 becomes a free rotation state, and therefore, the overdrive mechanism 21 does not perform torque transmission.

The above ring gear R21 is an output element, and transmits dynamic power to the dynamic power division mechanism 22. In the example shown in FIG. 1, the dynamic power division mechanism 22, which corresponds to a differential mechanism in the embodiment of the disclosure, is configured by a single pinion type planetary gear mechanism. Therefore, the dynamic power division mechanism 22 includes three rotation elements: a sun gear S22, a ring gear R22 disposed on a circle concentric with the sun gear S22, and a carrier C22 holding, in a rotatable and revolvable manner, a pinion gear engaged with the sun gear S22 and the ring gear R22. The carrier C22 is linked with a ring gear R21 of the overdrive mechanism 21. The output element of the dynamic power division mechanism 22 is the ring gear R22, and the ring gear R22 is linked with an output gear 25. The sun gear S22 is linked with the first motor generator 23, and the sun gear S22 is the reaction element. The first motor generator 23 corresponds to an electric generator in the embodiment of the disclosure.

The sun gear S22 is united with a sun gear shaft, and the input shaft 24 rotatably passes through the interior of the sun gear shaft. Then, a second clutch CS to selectively link the input shaft 24 and the sun gear S22 is provided. The second clutch CS is a clutch for setting a series mode, as described later.

A countershaft 26 is disposed parallel to the input shaft 24, and on the countershaft 26, a driven gear 27 and a drive gear 28 are provided so as to rotate in a united manner. The driven gear 27 is engaged with the above-described output gear 25. Further, the drive gear 28 is engaged with a ring gear 30 of a differential gear 29 that is a final drive gear. The driving power is transmitted from the differential gear 29 to right and left driving wheels 31. A series of gears of the driven gear 27 and the drive gear 28 constitutes a speed reduction mechanism. A path L along which dynamic power is transmitted from the above output gear 25 to the driving wheels 31 through the countershaft 26 and the differential gear 29 corresponds to a transmission path in the embodiment of the disclosure. Here, in FIG. 1, for the convenience of illustration, the drive gear 28 and the differential gear 29 are displaced and described on the right side of FIG. 1.

A second motor generator 32, which corresponds to an electric motor in the embodiment of the disclosure, is disposed parallel to the input shaft 24 and the countershaft 26. Furthermore, a fluid coupling 33 is disposed on an identical axis line to the second motor generator 32. The fluid coupling 33 includes a lock-up clutch CL. Therefore, the second motor generator 32 and the fluid coupling 33 are provided at positions apart from the above-described transmission path. The fluid coupling 33 is configured to dispose a pump impeller 35, which is a driving-side member, and a turbine runner 36, which is a driven-side member, such that they face each other, and to transmit torque between the pump impeller 35 and the turbine runner 36 by feeding the spiral flow of fluid (or oil) generated by the pump impeller 35, to the turbine runner 36. The lock-up clutch CL is disposed in parallel with the pump impeller 35 and the turbine runner 36. Then, the pump impeller 35 is linked with the second motor generator 32. Further, a turbine shaft 37 united with the turbine runner 36 passes through a central part of the second motor generator 32, and extends to the driven gear 27 side. Then, another drive gear 38 engaged with the driven gear 27 is attached to the turbine shaft 37.

The lock-up clutch CL is configured by a clutch that transmits torque by mechanically linking the pump impeller 35 or a member united with the pump impeller 35 and the turbine runner 36 or a member united with the turbine runner 36 and that is hydraulically controlled such that the transmission torque capacity changes continuously. Here, a damper 39 is provided in series with the lock-up clutch CL. Further, the fluid coupling 33 and the lock-up clutch CL may be a conventionally known torque converter with a lock-up clutch.

By the above-described dynamic power division mechanism 22, the dynamic power (power) output by the engine 20 is divided to the first motor generator 23 side and the output gear 25 side. In that case, the first motor generator 23 functions as an electric generator, and thereby, gives reaction torque to the sun gear S22. As a result, the engine torque is amplified by the dynamic power division mechanism 22, and is output from the output gear 25. The engine torque is sometimes called direct transmission torque, and the direct transmission torque is transmitted to the driving wheels 31 through the transmission path L. In other words, the torque output by the engine 20 is not applied to the fluid coupling 33. Therefore, a small-size fluid coupling having a small capacity can be adopted as the fluid coupling 33.

The electric power generated by the first motor generator 23 is fed to the second motor generator 32. The second motor generator 32 functions as a motor, and the output torque is added to the torque output from the output gear 25, at the driven gear 27. Therefore, the motor generators 23, 32 are electrically connected through an electric power source unit 42 including an inverter 40 and an electric storage apparatus 41. Here, the motor generators 23, 32, as an example, are configured by three-phase synchronous electric motors.

Figure 2:
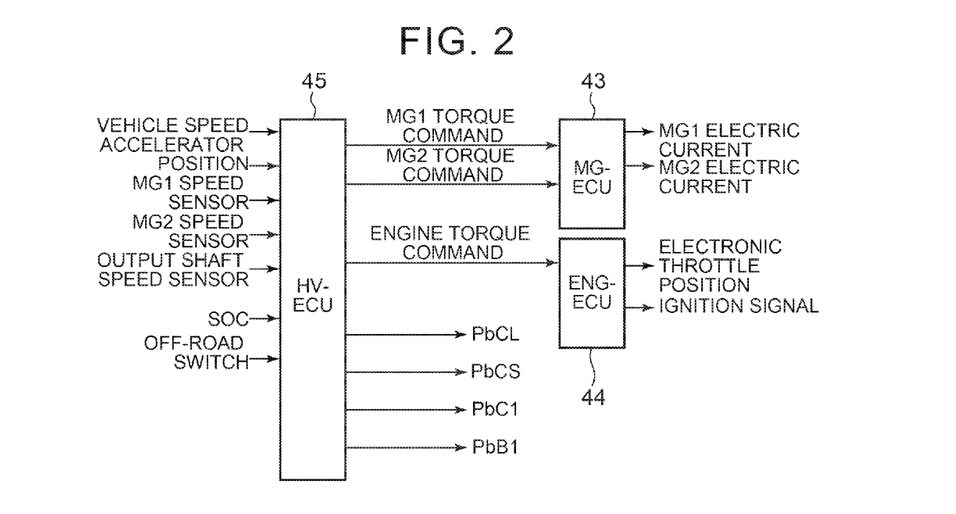
FIG. 2 is a block diagram for describing a control system for the hybrid vehicle.

FIG. 2 is a block diagram showing a control system for the above hybrid vehicle. A motor-generator electronic control apparatus (MG-ECU) 43 to control the motor generators 23, 32, and an engine electronic control apparatus (ENG-ECU) 44 to control the engine 20 are provided. The electronic control apparatuses 43, 44 are configured mainly by microcomputers, and are configured to perform computations based on a variety of input signals or a variety of input data and to output the computation results as control command signals. The MG-ECU 43, mainly, is configured to control the respective electric currents (MG1 electric current, MG2 electric current) in the first motor generator 23 and the second motor generator 32. Further, the ENG-ECU 44, mainly, is configured to output, to the engine 20, an electronic throttle position signal for commanding the position of an electronic throttle valve (not illustrated) of the engine 20, and an ignition signal for commanding the ignition and the timing of the ignition.

There is provided a hybrid electronic control apparatus (HV-ECU) 45 that outputs command signals to the electronic control apparatus 43, 44, and therewith, performs the control of the engagement/disengagement of the above-described clutches C1, CS, CL, and brake B1, and the control of the transmission torque capacity. Similarly to the above-described electronic control apparatus 43, 44, the HV-ECU 45 is configured mainly by a microcomputer, and is configured to perform computations based on a variety of input signals or a variety of input data and to output the computation results as control command signals. Examples of the data to be input include vehicle speed, accelerator position, the detection data by a speed sensor for the first motor generator (MG1), the detection data by a speed sensor for the second motor generator (MG2), the detection data by a speed sensor for an output shaft (for example, the above countershaft 26), state-of-charge (SOC), a signal from an off-road switch, and the like. Further, as command signals to be output, for example, a torque command for the first motor generator (MG1) and a torque command for the second motor generator (MG2) are output to the MG-ECU 43, and an engine torque command is output to the ENG-ECU 44. Furthermore, control hydraulic pressures PbC1, PbCS, PbCL, PbB1 for the clutches C1, CS, CL, and the brake B1 are output from the HV-ECU 45. Here, the above ECUs 43, 44, 45 constitute a controller.

Figure 3:
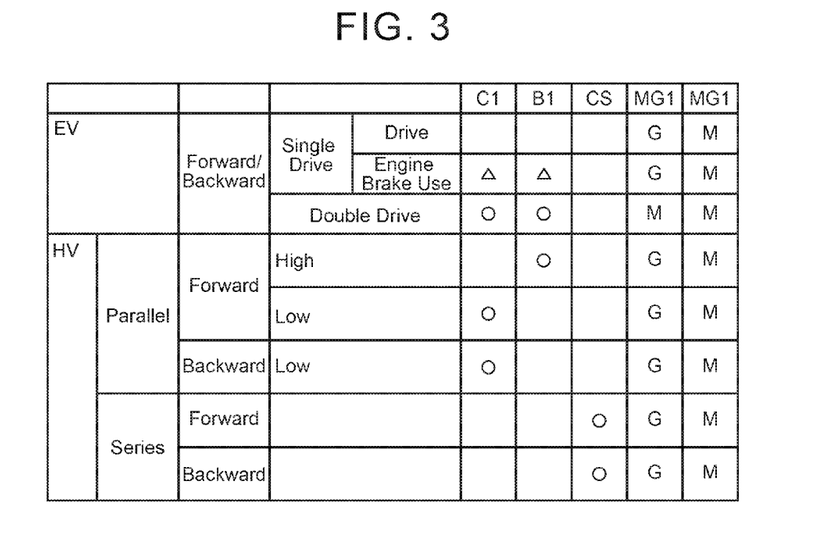
FIG. 3 is a table collectively showing engagement/disengagement states of a first clutch, a second clutch, and a brake in each running mode of the hybrid vehicle, and a function of each motor generator.

Various running modes are set by making the above motor generators 23, 32 function as motors or electric generators and controlling the clutches C1, CS, and the brake B1 to engagement or disengagement states. FIG. 3 collectively shows the running modes. With respect to the clutches C1, CS, and the brake B1 in FIG. 3, a circle mark shows the engagement state, a triangle mark shows that either one is in the engagement state, and a blank shows the disengagement state. Further, with respect to the first motor generator (MG1) and the second motor generator (MG2) in FIG. 3, "G" shows that the motor generator functions mainly as an electric generator, and "M" shows that the motor generator functions mainly as a motor at the time of driving and functions as a generator at the time of regeneration. A hybrid mode (HV) is a mode of running while generating driving power with the engine 20 and the motor generators 23, 32, and a parallel mode and a series mode can be selected. As the forward movement in the parallel mode, a running in which the above-described overdrive mechanism 21 is set to the overdrive stage (high), and a running in which the overdrive mechanism 21 is set to the direct connection stage (low) are possible. The overdrive stage is set by engaging only the brake B1. In that case, the first motor generator 23 functions as an electric generator (G), and the speed of the engine 20 is controlled to a speed allowing for a good fuel efficiency. The electric power generated by the first motor generator 23 is fed to the second motor generator 32, and the second motor generator 32 functions as a motor (M). In contrast, the direct connection stage is set by engaging only the first clutch C1, and in that case, the functions of the motor generator 23, 32 are the same as those in the case of the running in the overdrive stage.

Figure 4:
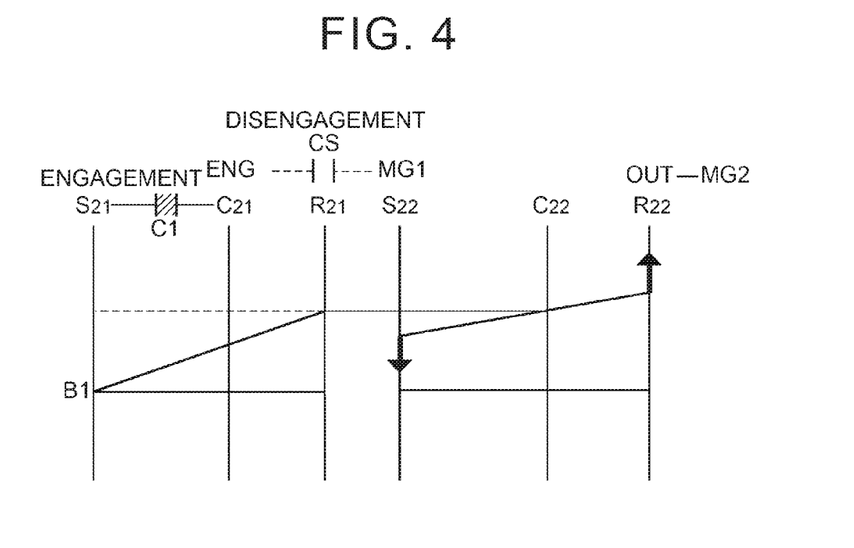
FIG. 4 is a collinear diagram showing an operating state in a hybrid mode.

FIG. 4 is a collinear diagram for the planetary gear mechanism configuring the overdrive mechanism 21 and the planetary gear mechanism configuring the dynamic power division mechanism 22 when the vehicle runs in the hybrid mode. The left side of FIG. 4 is a collinear diagram for the overdrive mechanism 21, and the right side is a collinear diagram for the dynamic power division mechanism 22. At the time of forward movement, the sun gear S21 is fixed by the brake B1, and the carrier C21 is rotated by the engine 20. Therefore, the ring gear R21 rotates at a speed that is higher than the engine speed. That is, the overdrive mechanism 21 becomes the overdrive stage in which the change gear ratio is lower than "1", In the dynamic power division mechanism 22, the carrier C22 rotates with the ring gear R21 of the overdrive mechanism 21, and the torque is the torque in the positive direction (the rotation direction of the engine 20). In that state, the first motor generator 23 functions as an electric generator, the torque in the negative direction (the direction of stopping the rotation) acts on the sun gear S22, and the torque in the positive direction associated with that acts on the ring gear R22. That is, the dynamic power of the engine 20 is divided to the sun gear S22 side and the ring gear R22 side. Then, the electric power generated by the first motor generator 23 is fed to the second motor generator 32, and the second motor generator 32 functions as a motor. Therefore, the torque is added to the torque to be output from the ring gear R22, and is output toward the driving wheels 31. The broken line in FIG. 4 shows the operating state when the direct connection stage is set in the overdrive mechanism 21. Here, in the backward running, by the dynamic power output by the engine 20, the first motor generator 23 rotates to generate electricity, and by the electric power, the second motor generator 32 functions as a motor in the negative rotation direction.

The series mode is a mode of running by driving the first motor generator 23 as an electric generator by the engine 20 and driving the second motor generator 32 as a motor by the electric power. Therefore, by engaging only the second clutch CS, the dynamic power of the engine 20 is transmitted to the first motor generator 23, and the first motor generator 23 functions as an electric generator (G). Further, by the feed of the electric power generated by the first motor generator 23, the second motor generator 32 functions as a motor (M), and rotates positively to run forward or rotates negatively to run backward.

An EV mode is a mode of running by the electric power of the electric storage apparatus without using the dynamic power of the engine 20, and therefore, the vehicle runs as an electric vehicle (EV: Electric Car). The second motor generator 32 is linked with the driving wheels 31 through the fluid coupling 33 or the lock-up clutch CL. Therefore, in the EV mode, mainly, the second motor generator 32 operates as a driving power source, and when the driving power or the braking power is insufficient, the first motor generator 23 is used concurrently. That is, a single drive mode of using only the second motor generator 32 and a double drive mode of using both the motor generators 23, 32 are possible.

In the single drive mode, since only the second motor generator 32 operates as a driving power source, the clutches C1, CS, and the brake B1 are disengaged, and the first motor generator 23, which is not particularly controlled, performs neither powering nor regeneration. Then, the second motor generator 32 functions as a motor (M) at the time of driving, and functions as an electric generator (G) at the time of braking. When the braking power associated with regeneration is insufficient, at least either one of the first clutch C1 and the brake B1 is engaged. Further, the motor generators 23, 32 function as electric generators (G), and the negative torque associated with the electricity generation acts as braking power.

The double drive mode is a running mode of engaging the first clutch C1 and the brake B1 and operating both the motor generators 23, 32 as motors (M). In the overdrive mechanism 21, the first clutch C1 is engaged, and the whole of the overdrive mechanism 21 is united. In that state, the brake B1 is engaged, and thereby, the rotation of the whole of the overdrive mechanism 21 is stopped. Therefore, the carrier C22 of the dynamic power division mechanism 22 linked with the ring gear R21 is fixed, and in that state, the first motor generator 23 operates as a motor in the negative rotation direction. Accordingly, the torque by the first motor generator 23 is output from the ring gear R22 as the torque in the positive rotation direction. Further, the second motor generator 32 operates as a motor in the positive rotation direction. Accordingly, the torque of the second motor generator 32 is added to the torque to be output from the output gear 25. At the time of backward movement, the torque directions of the motor generators 23, 32 are opposite to those at the time of forward movement.

In the case of the running in the hybrid mode, the first motor generator 23 functions as an electric generator, and gives reaction torque to the sun gear S22. The torque input from the engine 20 to the carrier C22 is amplified depending on the gear ratio of the planetary gear mechanism configuring the dynamic power division mechanism 22 (the ratio between the number of the teeth of the ring gear R22 and the number of the teeth of the sun gear S22), and is output from the output gear 25 toward the driving wheels 31. Therefore, when the reaction torque by the first motor generator 23 is low, the engine torque to be output from the output gear 25 is reduced. The first motor generator 23 generates the reaction torque by performing electricity generation, and therefore, when the electricity generation is restricted, the reaction torque is reduced. An example of the case where the electricity generation is restricted is a case where the state-of-charge (SOC) of the electric storage apparatus 41 is sufficiently high and is a so-called full charge state in which the state-of-charge reaches a previously determined upper limit or a charge state near the full charge state. For securing the driving torque in such a state, the control apparatus according to the disclosure is configured to execute a control described below.

Figure 5:
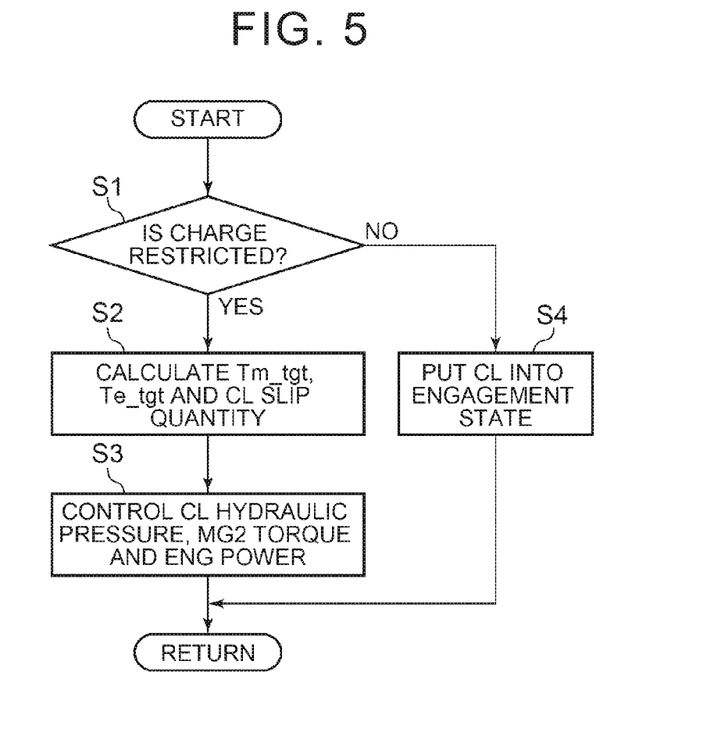
FIG. 5 is a flowchart for describing an exemplary control that is executed by the control apparatus according to the disclosure.

FIG. 5 is a flowchart for describing an example of the control. The control routine is executed repeatedly at a predetermined short time interval by the above-described HV-ECU 45, when the engine 20 outputs dynamic power. After the start of the routine, first, whether the charge of the electric storage apparatus 41 is restricted is determined (step S1). The determination, for example, may be performed by the comparison between the SOC input to the HV-ECU 45 and a previously stored reference value. In the case where the positive determination is made in step S1 because the electric storage apparatus 41 is in the so-called full charge state or in a state near the full charge state, the HV-ECU 45 calculates a target torque Tm_tgt of the second motor generator 32, a target torque Te_tgt of the engine 20, and a slip quantity of the lock-up clutch CL (that is, a differential rotation quantity of the fluid coupling 33) (step S2). An example of the calculation will be described below.

Figure 6:
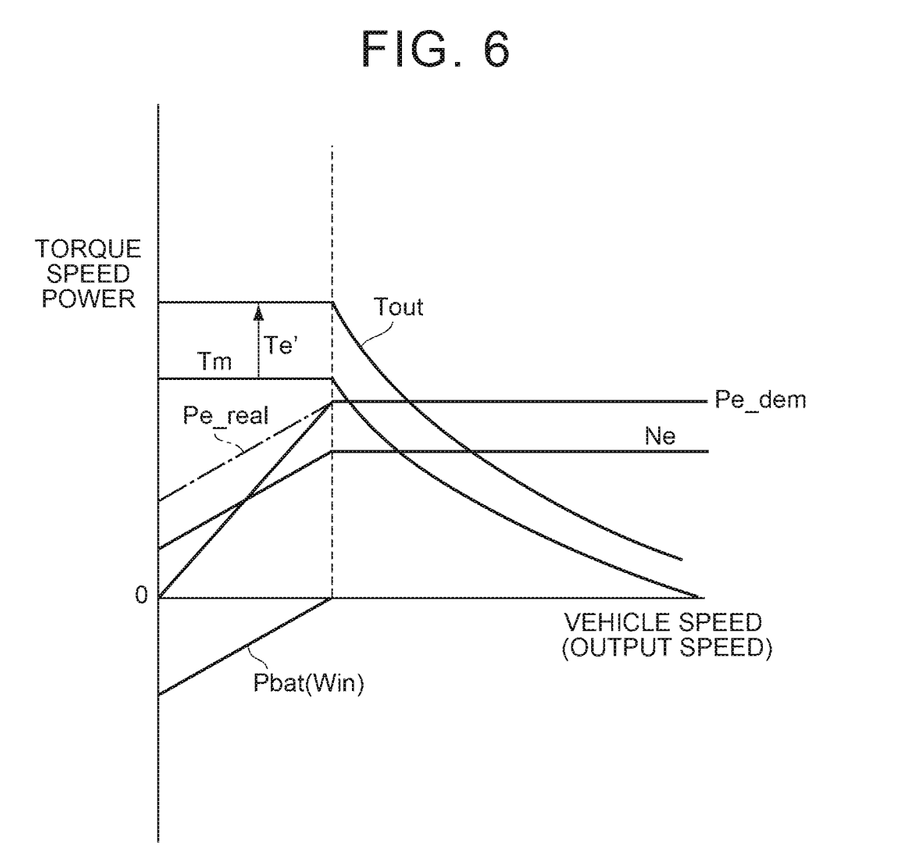
FIG. 6 is a linear diagram showing a relation of the balance between power and torque.

FIG. 6 shows a relation of the balance between power and torque when the vehicle starts to move in a state in which the vehicle is at a stop while driving the engine 20. Speed Ne and power Pe_real of the engine 20 are predetermined values, and the output is higher than demand power Pe_dem. The power difference is used for the charge, as battery power Pbat, when the charge quantity of the electric storage apparatus 41 is small. The battery power Pbat is power Win with which the electric storage apparatus 41 is charged. Meanwhile, the torque output by the engine 20 is increased or decreased by the overdrive mechanism 21 and the dynamic power division mechanism 22, and is output toward the driving wheels 31. The torque is direct transmission torque Te'. Further, the electric power generated by the first motor generator 23 is fed to the second motor generator 32, and thereby, the second motor generator 32 outputs torque Tm. Therefore, output torque Tout by the engine 20 and the second motor generator 32 is torque (Tm+Te') resulting from summing the direct transmission torque Te' and the torque Tm by the second motor generator 32. Here, in the power train having the configuration shown in FIG. 1, the torque Tm of the second motor generator 32 is torque Tturbin of the turbine runner 36.

The engine speed Ne increases with the increase in the vehicle speed V. Thereby, the difference between the real power Pe-real and the demand power Pe_dem, that is, the excess power is gradually reduced, and finally, becomes zero. If the electric storage apparatus 41 can be charged in the process, an intended output torque Tout can be obtained. Here, the demand power Pe_dem is evaluated based on the demand driving quantity of the accelerator position or the like, the vehicle speed, a previously prepared map and the like, similarly to a conventionally known driving power control. In contrast, when the charge is restricted, the excess power is restricted. Therefore, the direct transmission torque Te' by the engine 20 is restricted, and the output torque Tout becomes insufficient. Hence, the control apparatus in the embodiment of the disclosure consumes, as a loss, the power that the electric storage apparatus 41 cannot receive (be charged), and thereby, secures the output torque Tout.

Figure 7:
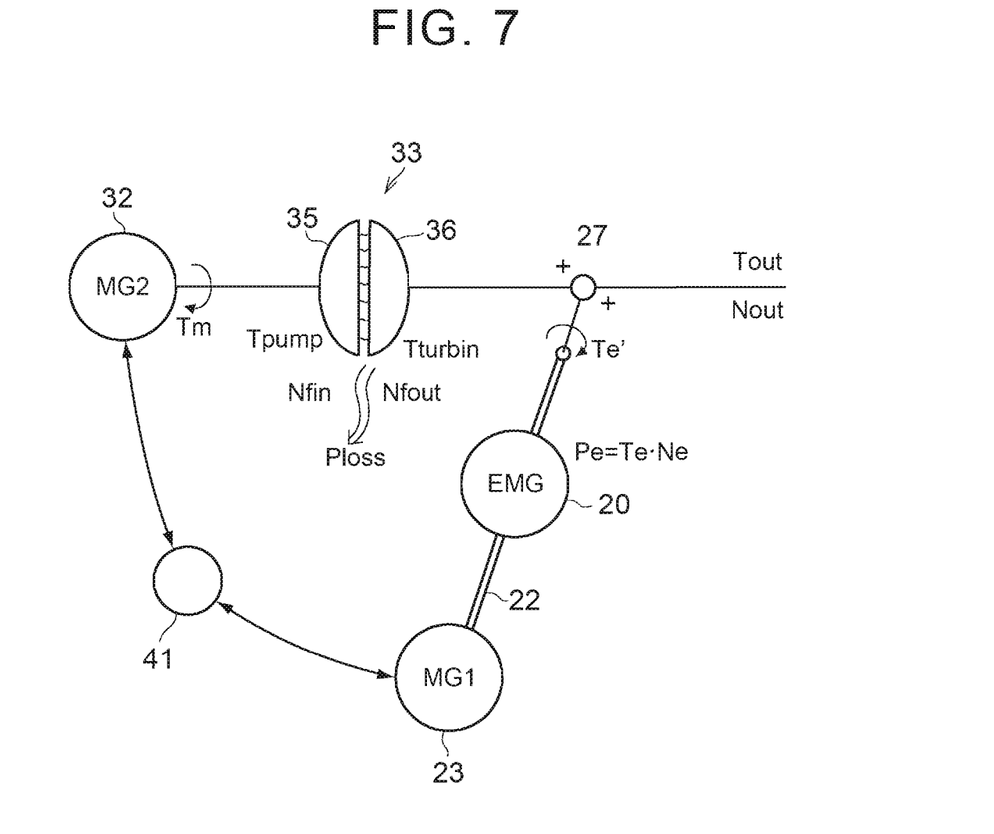
FIG. 7 is a diagram showing a model for describing a computation that is executed by the control apparatus in an embodiment of the disclosure.

FIG. 7 shows a model for describing a computation that is executed by the control apparatus in the embodiment of the disclosure. The power Pe output by the engine 20 is the product (Ne×Te) between the speed Ne and the torque Te, and the direct transmission torque Te' based on the power Pe is transmitted to the countershaft 26 and the driving wheels 31 through the driven gear 27. Meanwhile, the first motor generator 23 is driven by the engine 20, to generate electricity, and the electric power is fed to the electric storage apparatus 41 and the second motor generator 32. By the fed electric power, the second motor generator 32 operates as a motor, and outputs the torque Tm. In a state in which the lock-up clutch CL is disengaged, there is a difference between speed Nfin of the pump impeller 35 and speed Nfout of the turbine runner 36. Here, torque Tpump of the pump impeller 35 is the product ($\tau \times Nfin^2$) between capacity coefficient $\tau$ of the fluid coupling 33 and the square of the speed Nfin, and the torque Tturbin of the turbine runner 36 is the product ($\tau \times Nfout^2$) between the capacity coefficient $\tau$ and the square of the speed Nfout. The torque of the turbine runner 36 is transmitted from the drive gear 38 to the driven gear 27 or the countershaft 26, and is added to the direct transmission torque Te', so that output torque Nout is obtained. Here, the output speed is represented as Nout. Then, the pump impeller 35 and the turbine runner 36 perform relative rotation, and thereby, a dynamic power loss is generated due to the shearing and stirring of the oil, so that the heat corresponding to a loss power Ploss is generated. That is, the so-called excess power that the electric storage apparatus 41 cannot receive is consumed as the loss power Ploss.

Figure 8:
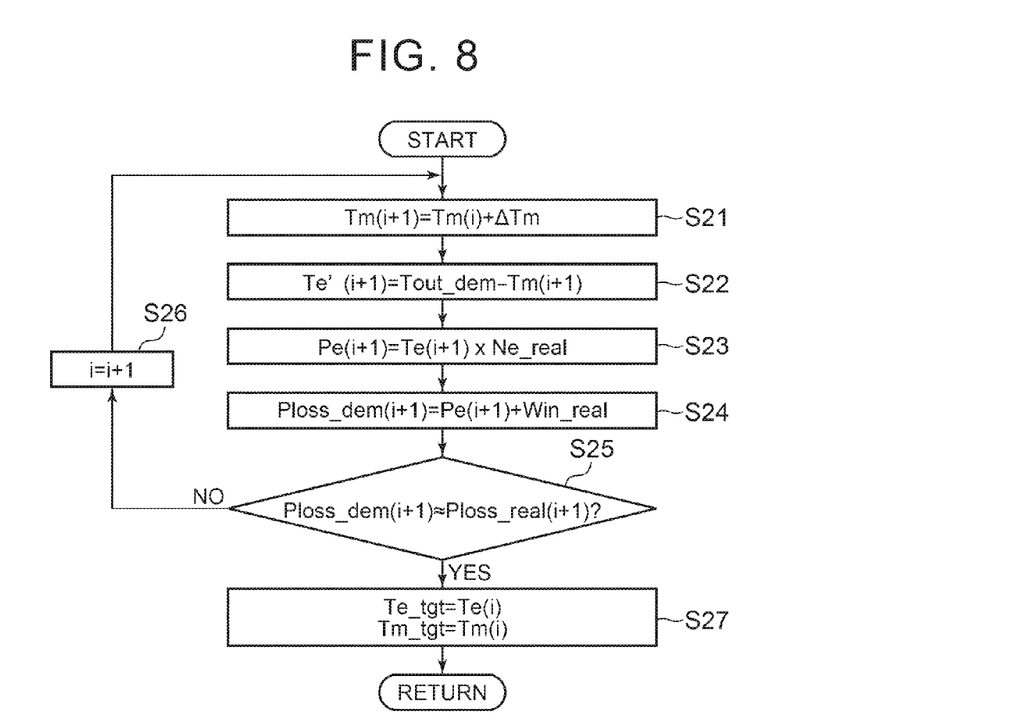
FIG. 8 is a flowchart for describing an exemplary control of evaluating target torques of an engine and a second motor generator.

In that case, as the so-called slip or differential rotation speed in the fluid coupling 33 increases, the loss power Ploss increases, but the torque to be output from the fluid coupling 33, that is, the turbine torque Tturbin decreases, causing the decrease in the output torque Tout. Hence, the slip quantity of the lock-up clutch CL, the torque Te of the engine 20, and the torque Tm of the second motor generator 32 are controlled such that the excess power that the electric storage apparatus 41 cannot receive is equal to the power that the fluid coupling 33 consumes. FIG. 8 is a flowchart showing an example of the control.

A routine shown in FIG. 8 is a subroutine that is executed in the above-described step S2 of FIG. 5. First, the torque Tm of the second motor generator 32 is evaluated (step S21). The torque Tm of the second motor generator 32 gradually increases from zero. Therefore, a first-time value Tm(0) is zero, and a previously determined increase quantity ΔTm is added to a last-time value Tm(i) for each cycle of the execution of the routine of FIG. 8, so that the torque is calculated.

$$Tm(i+1)=Tm(i)+\Delta Tm$$

Meanwhile, the direct transmission torque Te' is calculated (step S22). The direct transmission torque Te' is evaluated by subtracting the torque Tm of the second motor generator 32 from demanded output torque Tout_dem. Here, the demand output torque Tout_dem is evaluated from the demand power and the vehicle speed, after the demand power is evaluated based on the demand driving quantity of the accelerator position or the like and the vehicle speed.

$$Te'(i+1)=Tout\_dem-Tm(i+1)$$

Subsequently, engine power Pe(i+1) is calculated from engine torque Te(i+1) and real engine speed Ne_real (step S23). Here, the engine torque Te(i+1) is evaluated based on the above direct transmission torque Te'(i+1) and the gear ratio in the dynamic power division mechanism 22 and the transmission path L. Further, the real engine speed Ne_real can be evaluated based on the vehicle speed V, the accelerator position, a previously prepared map and the like.

$$Pe(i+1)=Te(i+1)\times Ne\_real$$

The loss power Ploss to be demanded is the excess power resulting from eliminating the power (electric power quantity) Win_real with which the electric storage apparatus 41 can be charged, from the above engine power Pe(i+1), and therefore, by the computation, demand loss power Ploss dem is calculated (step S24).

$$Ploss\_dem(i+1)=Pe(i+1)+Win\_real$$

Here, in the above formula, the chargeable power Win_real is a negative value.

Whether real loss power Ploss_real(i+1) is nearly equal to the above demand loss power Ploss_dem is determined (step S25). The determination may be the determination of whether the difference between the real loss power Ploss_real(i+1) and the demand loss power Ploss_dem is smaller than a previously determined reference value. Further, the real loss power Ploss_real(i+1) can be evaluated by the following computation.

$$Ploss=\tau Nfin^2 \cdot Nfin - \tau Nfin^2 \cdot Nfout = \tau Nfin^2(Nfin-e \cdot Nin) = \tau Nm^3(1-e)$$

Here, Nfin=Nm (the speed of the second motor generator 32) holds. Further, e is the speed ratio in the fluid coupling 33, and e=Nfout/Nfin holds. Therefore, the real loss power Ploss is evaluated, because the speed Nfout of the turbine runner 36 is evaluated from the vehicle speed and the torque Tin of the second motor generator 32 is the value determined in step S21 of FIG. 8.

In the case where the negative determination is made in the above step S25 because the difference between the demand value and the actual value for the loss power Ploss is still large, the increment (i+1) of a count value i is performed (step S26). Thereafter, the process returns to step S21. On the other hand, in the case where the positive determination is made in step S25, the demand loss power Ploss_dem can be roughly satisfied by the torque Tm of the second motor generator 32 and the speed ratio e of the fluid coupling 33 at that time. Therefore, the torque Tm(i) of the second motor generator 32 at that time is set as the target torque Tm_tgt, and the engine torque Te(i) at that time is set as the target engine torque Te_tgt (step S27).

In the routine shown in FIG. 8, the second motor generator 32 and the engine 20 are controlled such that the respective target torques evaluated as described above are achieved, and the slip quantity of the lock-up clutch CL is controlled such that the above speed ratio e is achieved (step S23). In other words, the feedback control of the hydraulic pressure of the lock-up clutch CL only needs to be performed such that the speed ratio becomes a speed ratio allowing for the achievement of a necessary loss power. Here, in the routine shown in FIG. 5, in the case where the negative determination is made in step S1 because the charge is not restricted, the lock-up clutch CL is controlled to the engagement state (step S4).

As shown in the above step S22, when the torque Tm of the second motor generator 32 increases and the loss power Ploss increases, the direct transmission torque Te' decreases, the output torque Tout becomes insufficient, and the energy loss increases. On the other hand, when the torque Tm of the second motor generator 32 decreases and the loss power Ploss decreases, it is necessary to decrease the engine power for reducing the excess power, and thereby, the output torque Tout decreases. In contrast, in the above-described control according to the embodiment of the disclosure, the total quantity of the excess power with which the electric storage apparatus 41 cannot be charged is consumed by the fluid coupling 33 as the loss power. In the case where the battery power Win of the electric storage apparatus 41 is zero, the total quantity of the power (the power except the so-called direct transmission power for running) that is of the engine power and that is supplied for electricity generation is consumed by the fluid coupling 33.

Figure 9:
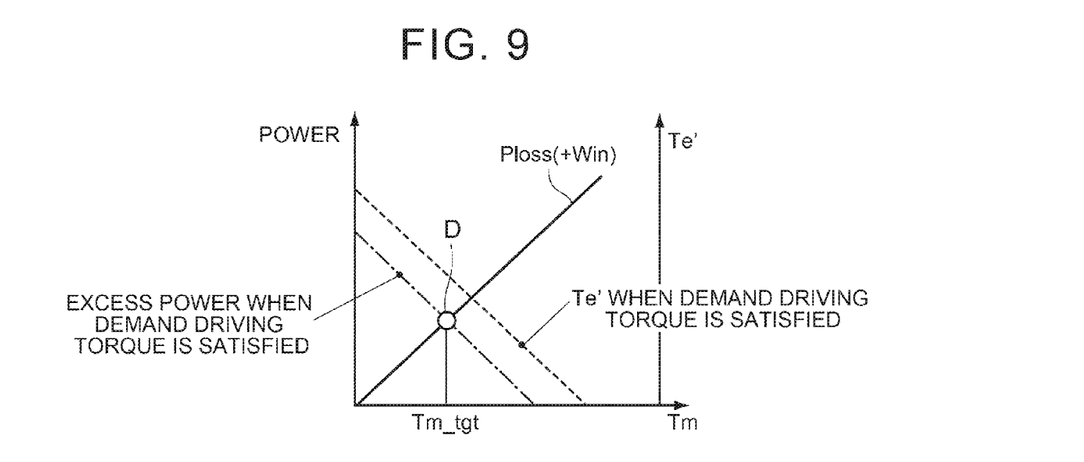
FIG. 9 is a diagram showing a relation of the torque of the second motor generator, engine power, and direct transmission torque.

FIG. 9 is a diagram showing the relation. The direct transmission torque Te' decreases with the increase in the torque Tm of the second motor generator 32, and similarly, the engine power Pe corresponding to the direct transmission torque Te' decreases with the increase in the torque Tm of the second motor generator 32. In contrast, the loss power Ploss increases with the increase in the torque Tm of the second motor generator 32. Here, in the case where the electric storage apparatus 41 can be charged, the charge power (the battery power) Win is added to the loss power Ploss, and the resulting value also increases with the increase in the torque Tm of the second motor generator 32.

In the above-described control example shown in FIG. 8, since the torque Tm of the second motor generator 32 is gradually increased, the loss power Ploss (or the power resulting from adding the battery power Win to the loss power Ploss) is a small value at the beginning, and therefore, the excess power that the electric storage apparatus 41 cannot receive is a large value, as shown by the chain line. As the torque Tm of the second motor generator 32 increases, the loss power Ploss (or the power resulting from adding the battery power Win to the loss power Ploss) increases, and the excess power gradually decreases. As a result, finally, the two coincide with each other. This is a state in which the positive determination is made in step S25, in the control example shown in FIG. 8. Therefore, the torque at the operating point (the point shown by the circle mark in FIG. 9) where the loss power Ploss (or the power resulting from adding the battery power Win to the loss power Ploss) and the excess power coincide with each other is adopted as the target torque Tm_tgt of the second motor generator 32. At the operating point, the sum of the direct transmission torque Te and the torque Tm of the second motor generator 32 is maximized.

Here, in the above embodiment, for simplifying the description, the energy balance is calculated by the electricity generation energy by the first motor generator 23 and the energy that is lost (consumed) in the fluid coupling 33. The disclosure is not limited to this. Actually, in addition to the consumption in the fluid coupling 33, the electric power generated by the first motor generator 23 is consumed as a loss by the operation of the first motor generator 23, and is consumed as a loss in electric circuits such as the inverter that control the motor generators 23, 32. Therefore, in the disclosure, the energy to be conclusively consumed by the fluid coupling 33 may be calculated, in consideration of the energy consumptions.

Further, the above control example shown in FIG. 8 is an example of evaluating the above point D by gradually increasing the torque of the second motor generator 32. However, in the control apparatus in the embodiment of the disclosure, conversely, the torque Tin of the second motor generator 32 may be sufficiently high at the beginning, the torque Tm may be gradually decreased from that state, and thereby, the torque at the above point D may be evaluated.

Figure 10:
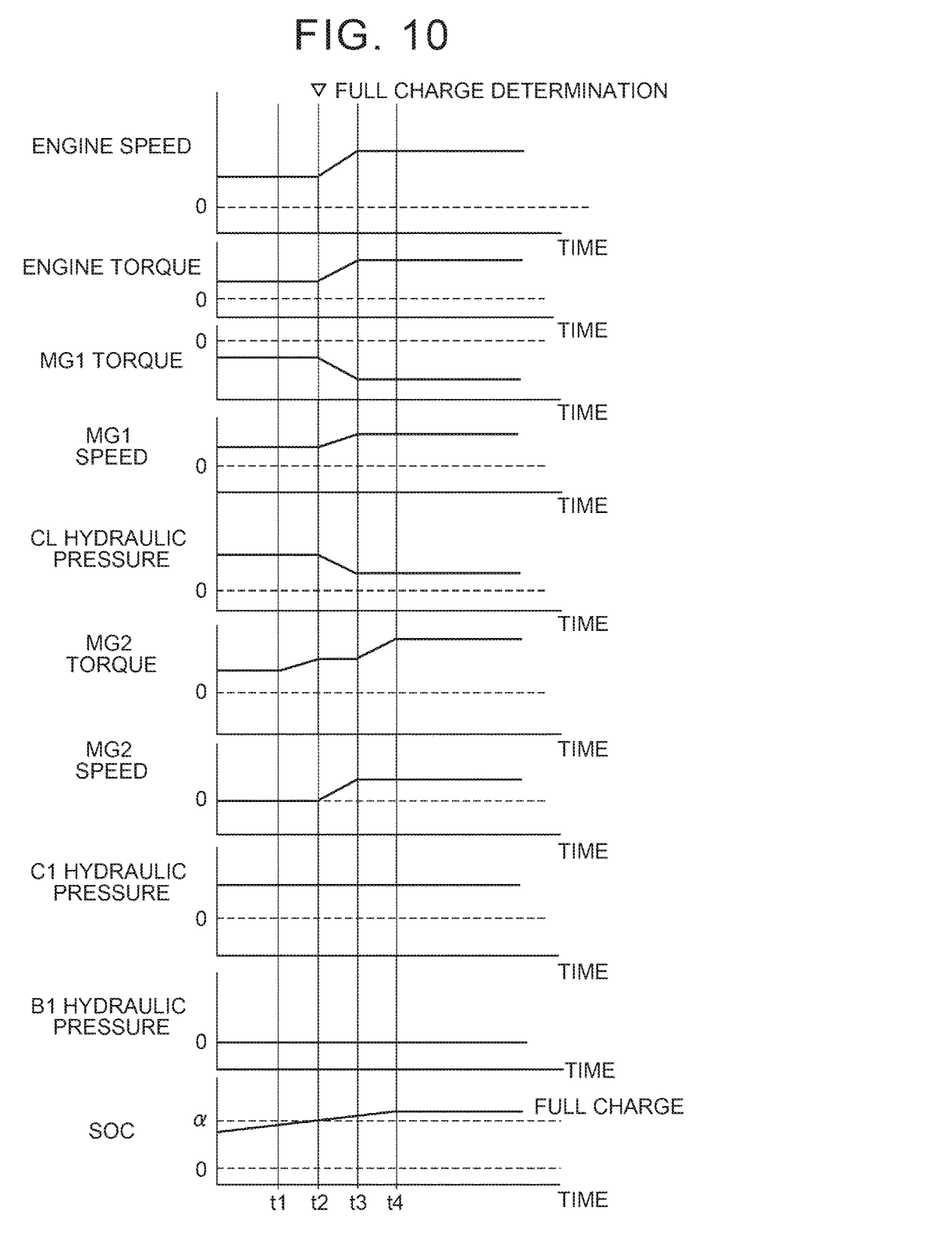
FIG. 10 is a timing chart showing changes in the speed of the second motor generator, the hydraulic pressure of a lock-up clutch and the like in the case where the control apparatus according to the disclosure performs the control when the vehicle is at a stop while preparing for the movement start in the hybrid mode.

FIG. 10 is a timing chart showing changes in the engine speed, the engine torque, the speeds and torques of the motor generators 23, 32, the hydraulic pressure of the lock-up clutch CL, and the like when the above-described control shown in FIG. 5 is performed. In a state in which the engine 20 revolves at a predetermined speed such as an idling speed and the vehicle is at a stop, the first motor generator 23 functions as an electric generator. The second motor generator 32 is stopped because the vehicle is at a stop, and the torque is set to a predetermined low torque. Therefore, some of the electric power generated by the first motor generator 23 is consumed by the second motor generator 32, and most is used for the charge of the electric storage apparatus 41. Therefore, the SOC gradually increases. When the SOC reaches a predetermined threshold that is previously set to a lower value than a value indicating the full charge state (time t1), the torque of the second motor generator 32 increases, and the consumption of the electric power gradually increases. Furthermore, since the vehicle is at a stop, the overdrive mechanism 21 is at the direct connection stage (low). That is, the hydraulic pressure of the first clutch C1 is controlled to a predetermined pressure such that the first clutch C1 is engaged, and the hydraulic pressure of the brake B1 is controlled to zero such that the brake B1 is disengaged.

Also in this period, the charge of the electric storage apparatus 41 is performed, and the SOC increases. When the SOC reaches a previously determined value α near the full charge (time t2), the slip control of the fluid coupling 33 is started. Specifically, the hydraulic pressure of the lock-up clutch CL is gradually decreased. Then, the lock-up clutch CL starts to slip, and the second motor generator 32 starts to rotate. Here, the torque of the second motor generator 32 is maintained to a torque at that time. Further, by the rotation of the second motor generator 32, the energy consumption increases. Therefore, the speed of the first motor generator 23 increases, and the torque (the negative torque in the direction of stopping the rotation) increases. Furthermore, the speed and torque (that is, power) of the engine 20 is controlled such that the demand driving quantity is satisfied.

Then, when the SOC further comes close to the full charge state (for example, when the difference between the current value of the SOC and the fuU charge value becomes a predetermined value or less) (time t3), the hydraulic pressure of the lock-up clutch CL is set to a previously determined lowest pressure, and the slip quantity of the fluid coupling 33 is set to a predetermined maximum value. Further, the speed and torque of the engine 20 and the speed and torque of the first motor generator 23 are maintained to speeds and torques at that time. Even at that time, the SOC continues increasing, and therefore, the second motor generator 32 increases the torque while maintaining the speed, and consumes the electric power generated by the first motor generator 23. Then, all of the electric power generated by the first motor generator 23 is consumed by the second motor generator 32 (time t4), and the torque of the second motor generator 32 is maintained to a torque at that time.

According to the control apparatus in the embodiment of the disclosure, the above-described control allows for the electricity generation by the first motor generator 23 and the generation of the reaction torque associated with the electricity generation, and thereby, it is possible to sufficiently increase the so-called direct transmission torque Te'. That is, the electric power generated by the first motor generator 23 is consumed by generating the differential rotation of the fluid coupling 33 and rotating the second motor generator 32, and therefore, it is possible to use the torque output by the second motor generator 32, as the driving torque. Particularly, the control is performed such that the sum of the direct transmission torque Te' and the torque Tm of the second motor generator 32 is maximized, and therefore, it is possible to obtain a necessary and sufficient driving power corresponding to the demand driving quantity. Further, the second motor generator 32 and the fluid coupling 33 are provided at a position apart from the transmission path along which the direct transmission torque Te' is transmitted to the driving wheels 31. Thereby, the direct transmission torque Te' from the engine 20 is not applied to the fluid coupling 33, and therefore, a small-size fluid coupling having a small capacity can be adopted as the fluid coupling 33. Furthermore, the excess energy is consumed as the loss energy Ploss, and even when heat is generated, the oil itself of the fluid coupling 33 is heated. Further, the oil is circulated between the fluid coupling 33 and a non-illustrated oil cooler or the like, and the heat is transferred to the exterior. Therefore, it is possible to avoid or suppress the decrease in durability due to the heat.

Here, an intended hybrid vehicle in the disclosure, in short, is a hybrid vehicle including an engine, an electric generator, a dynamic power division mechanism linked with the engine and the electric generator, an electric motor, and a coupling provided between the electric motor and a driving wheel, and is not limited to a hybrid vehicle including the gear train with the configuration shown in FIG. 1. For example, the above-described overdrive mechanism does not need to be included.

What is claimed is:

1. A control apparatus for a dynamic power transmission apparatus, the dynamic power transmission apparatus including a differential, an electric generator, an electric motor, and a fluid coupling, the differential divides dynamic power output by an engine to a driving wheel and the electric generator, the electric generator generates electric power such that the electric motor is driven by the electric power and torque of the electric motor is output to the driving wheel and to charge an electric storage apparatus with some of the electric power, the electric motor being disposed at a position apart from a transmission path along which the dynamic power of the engine is transmitted to the driving wheel through the differential, the fluid coupling being disposed between the electric motor and the transmission path, the control apparatus comprising:
   an electronic controller configured to restrict the charge of the electric storage apparatus with the electric power generated by the electric generator, depending on a state of the electric storage apparatus, and the electronic controller is configured to control the fluid coupling to differentially rotate and to drive the electric motor by the electric power such that a dynamic power loss is generated in the fluid coupling, when restricting the charge of the electric storage apparatus, wherein
   the electronic controller is configured to control the torque of the electric motor such that a power, which is of power output by the engine and with which the electric storage apparatus is incapable of being charged, is equal to a power of the dynamic power loss by differential rotation of the fluid coupling.

2. The control apparatus according to claim 1, wherein the electronic controller is configured to control the torque of the electric motor such that a sum of a torque to be transmitted to the driving wheel through the transmission path and a torque to be transmitted to the transmission path through the fluid coupling is maximized, when the engine outputs a predetermined power.

3. The control apparatus according to claim 1, wherein the differential includes a first rotation element, a second rotation element, and a third rotation element, the differential performs a differential action with the first rotation element, the second rotation element, and the third rotation element, the first rotation element to receive a torque of the engine, the second rotation element being linked with the electric generator, the third rotation element to output a torque to the driving wheel, and the fluid coupling adds the torque from the electric motor to the torque output from the third rotation element.

4. A control apparatus for a dynamic power transmission apparatus, the dynamic power transmission apparatus including a differential, an electric generator, an electric motor, and a fluid coupling, the differential divides dynamic power output by an engine to a driving wheel and the electric generator, the electric generator generates electric power such that the electric motor is driven by the electric power and torque of the electric motor is output to the driving wheel and to charge an electric storage apparatus with some of the electric power, the electric motor being disposed at a position apart from a transmission path along which the dynamic power of the engine is transmitted to the driving wheel through the differential, the fluid coupling being disposed between the electric motor and the transmission path, the control apparatus comprising:
   an electronic controller configured to restrict the charge of the electric storage apparatus with the electric power generated by the electric generator, depending on a state of the electric storage apparatus, and the electronic controller is configured to control the fluid coupling to differentially rotate and to drive the electric motor by the electric power such that a dynamic power loss is generated in the fluid coupling, when restricting the charge of the electric storage apparatus, wherein
   the electronic controller is configured to control the torque of the electric motor such that a sum of a torque to be transmitted to the driving wheel through the transmission path and a torque to be transmitted to the transmission path through the fluid coupling is maximized, when the engine outputs a predetermined power.

5. The control apparatus according to claim 4, wherein the differential includes a first rotation element, a second rotation element, and a third rotation element, the differential performs a differential action with the first rotation element, the second rotation element, and the third rotation element, the first rotation element to receive a torque of the engine, the second rotation element being linked with the electric generator, the third rotation element to output a torque to the driving wheel, and the fluid coupling adds the torque from the electric motor to the torque output from the third rotation element.

6. A control apparatus for a dynamic power transmission apparatus, the dynamic power transmission apparatus including a means for dividing power, an electric generator, an electric motor, and a fluid coupling, the means for dividing power divides dynamic power output by an engine to a driving wheel and the electric generator, the electric generator generates electric power such that the electric motor is driven by the electric power and torque of the electric motor is output to the driving wheel and to charge an electric storage apparatus with some of the electric power, the electric motor being disposed at a position apart from a transmission path along which the dynamic power of the engine is transmitted to the driving wheel through the means for dividing power, the fluid coupling being disposed between the electric motor and the transmission path, the control apparatus comprising:

a means for controlling configured to restrict the charge of the electric storage apparatus with the electric power generated by the electric generator, depending on a state of the electric storage apparatus, and the means for controlling is configured to control the fluid coupling to differentially rotate and to drive the electric motor by the electric power such that a dynamic power loss is generated in the fluid coupling, when restricting the charge of the electric storage apparatus, wherein the means for controlling is configured to control the torque of the electric motor such that a power, which is of power output by the engine and with which the electric storage apparatus is incapable of being charged, is equal to a power of the dynamic power loss by differential rotation of the fluid coupling.

7. The control apparatus according to claim 6, wherein the means for controlling is configured to control the torque of the electric motor such that a sum of a torque to be transmitted to the driving wheel through the transmission path and a torque to be transmitted to the transmission path through the fluid coupling is maximized, when the engine outputs a predetermined power.

8. The control apparatus according to claim 6, wherein the means for dividing power includes a first rotation element, a second rotation element, and a third rotation element, the means for dividing power performs a differential action with the first rotation element, the second rotation element, and the third rotation element, the first rotation element to receive a torque of the engine, the second rotation element being linked with the electric generator, the third rotation element to output a torque to the driving wheel, and the fluid coupling adds the torque from the electric motor to the torque output from the third rotation element.

* * * * *